(12) United States Patent
Misawa et al.

(10) Patent No.: US 9,705,679 B2
(45) Date of Patent: Jul. 11, 2017

(54) DATA AUTHENTICATION DEVICE AND DATA AUTHENTICATION METHOD

(71) Applicant: MITSUBISHI ELECTRIC CORPORATION, Tokyo (JP)

(72) Inventors: Manabu Misawa, Tokyo (JP); Nobuhiro Kobayashi, Tokyo (JP); Yukio Izumi, Tokyo (JP); Tsuneo Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 34 days.

(21) Appl. No.: 14/895,457

(22) PCT Filed: Jun. 2, 2014

(86) PCT No.: PCT/JP2014/002902
§ 371 (c)(1),
(2) Date: Dec. 2, 2015

(87) PCT Pub. No.: WO2014/196181
PCT Pub. Date: Dec. 11, 2014

(65) Prior Publication Data
US 2016/0112201 A1    Apr. 21, 2016

(30) Foreign Application Priority Data
Jun. 4, 2013   (JP) .................................. 2013-117727

(51) Int. Cl.
*H04L 29/06* (2006.01)
*H04L 9/32* (2006.01)
(Continued)

(52) U.S. Cl.
CPC ........... *H04L 9/3242* (2013.01); *H04H 20/62* (2013.01); *H04L 9/30* (2013.01); *H04L 9/3247* (2013.01);
(Continued)

(58) Field of Classification Search
CPC ....... H04L 9/3242; H04L 9/30; H04L 9/3247; H04W 12/06; H04H 20/62
See application file for complete search history.

(56) References Cited

U.S. PATENT DOCUMENTS 8,635,681 B2 * 1/2014 Zhang ................. H04L 63/0823
380/270
2006/0179297 A1 * 8/2006 Ikebe .................... H04L 63/126
713/153
(Continued)

FOREIGN PATENT DOCUMENTS

JP      2004-54128 A    2/2004
JP      2004-78053 A    3/2004
(Continued)

OTHER PUBLICATIONS

IT Security Center, Information-Technology Promotion Agency, Japan, "Approaches for Vehicle Information Security—Information Security for 'Networked' Vehicles", Retrieved From https://www.ipa.go.jp/files/000033402.pdf, Published Aug. 2013.*
(Continued)

*Primary Examiner* — Chau Le
(74) *Attorney, Agent, or Firm* — Birch, Stewart, Kolasch & Birch, LLP (57) ABSTRACT

For improving, when performing road-vehicle communication or vehicle-vehicle communication between a roadside device and in-vehicle devices or therebetween, efficiency of distribution information verification including digital signature verification and freshness verification, there are included a memory unit that stores, as an authentication information history, a history of second authentication information of communication data which was received in the past from another communication device and which includes first authentication information, distribution information, and the second authentication information and an authenti-
(Continued)

cation processing unit that verifies, on the basis of the first authentication information of new communication data being newly received communication data, authenticity of the second authentication information of the new communication data and that compares the second authentication information of the new communication data with the authentication information history stored in the memory unit to verify freshness of the new communication data.

4 Claims, 6 Drawing Sheets

(51) Int. Cl.
    *H04W 12/06*     (2009.01)
    *H04H 20/62*     (2008.01)
    *H04L 9/30*     (2006.01)
    *H04W 4/04*     (2009.01)
    *H04W 12/10*     (2009.01)

(52) U.S. Cl.
    CPC ........... *H04W 12/06* (2013.01); *H04L 63/123* (2013.01); *H04L 2209/24* (2013.01); *H04W 4/046* (2013.01); *H04W 12/10* (2013.01)

(56) References Cited

U.S. PATENT DOCUMENTS

| | | | |
|---|---|---|---|
| 2007/0124590 A1 | 5/2007 | Vanstone et al. | |
| 2007/0237145 A1* | 10/2007 | Adhikari | H04L 9/12 370/392 |
| 2009/0158396 A1* | 6/2009 | Baum | B60R 25/2018 726/4 |
| 2009/0258631 A1* | 10/2009 | Forsberg | H04L 63/08 455/411 |
| 2010/0296395 A1 | 11/2010 | Fukuda et al. | |
| 2011/0078444 A1* | 3/2011 | Jeong | H04L 63/126 713/170 |
| 2012/0159170 A1* | 6/2012 | Lee | H04W 12/02 713/169 |
| 2012/0311340 A1* | 12/2012 | Naganuma | G06F 21/35 713/176 |
| 2015/0318997 A1* | 11/2015 | Kobayashi | H04L 9/3268 713/156 |
| 2016/0344550 A1* | 11/2016 | Anton | H04L 9/3236 |

FOREIGN PATENT DOCUMENTS

| | | |
|---|---|---|
| JP | 2007-28015 A | 2/2007 |
| JP | 2007-88737 A | 4/2007 |
| JP | 2007-522739 A | 8/2007 |
| JP | 2008-60809 A | 3/2008 |
| JP | 2008-516317 A | 5/2008 |
| JP | 2010-273225 A | 12/2010 |
| JP | 2012-114702 A | 6/2012 |
| JP | 2012-227672 A | 11/2012 |
| JP | 2013-98719 A | 5/2013 |
| WO | WO 2011/105350 A1 | 9/2011 |

OTHER PUBLICATIONS

Checkoway et al., "Comprehensive Experimental Analyses of Automotive Attack Surfaces", Retrieved From http://www.autosec.org/pubs/cars-usenixsec2011.pdf, Published Aug. 2011.*
IEEE Standard for Wireless Access in Vehicular Environments-Security Services for Applications and Management Messages, IEEE Vehicular Technology Society, IEEE Std 1609.2TM-2013 (Revision of IEEE Std 1609.2-2006), Apr. 26, 2013.

* cited by examiner

DATA AUTHENTICATION DEVICE AND DATA AUTHENTICATION METHOD

TECHNICAL FIELD

The present invention relates to a data authentication device used for road-vehicle communication or vehicle-vehicle communication performed between a roadside device and in-vehicle devices or therebetween.

BACKGROUND ART

Recently, a driving support system has been studied in which road-vehicle broadcast communication and vehicle-vehicle broadcast communication are used to transmit from a roadside device placed by the roadside and an in-vehicle device mounted in the vehicle to another in-vehicle device, information such as information related to traffic jams and traffic-signals, traveling condition information such as a vehicle's speed and position, information of approaching emergency vehicles such as an ambulance, and control information of vehicles traveling in-file (hereinafter, these are collectively called distribution information), which thereby are utilized for safe driving and efficient driving.

As an example of a security measure for the driving support system, a road-vehicle communication system is disclosed in Patent Document 1 in which a digital signature of a public key cryptography algorithm is used.

In the road-vehicle communication system described above, it is also necessary to address an attack (replay attack) in which communication data including the distribution information is retransmitted. A countermeasure against the attack is to verify the freshness of the communication data. In the freshness verification, a series of operations are performed; that is, a vehicle stores communication data having been received, compares newly received communication data with the stored reception communication data and determines whether they agree; and then, if they agree, the vehicle does not accept the newly received data because it is recognized as the communication data having been received; or if they do not agree, the vehicle accepts the newly received data because it is recognized as communication data never having been received. However, this method requires a memory area corresponding to the size of the received communication data. To address this problem, there is a method in which a hash function is used for reducing a memory area necessary for freshness verification. In the method, with respect to the received communication data, a hash value is calculated through the hash function, to be stored; and then, when new communication data is received, a hash value is calculated with respect to the new communication data, and whether the hash value agrees with the stored hash value with respect to the prior received communication data is checked; and, if they agree, the newly received data is not accepted because it is recognized as communication data having been received; or if they do not agree, the newly received data is accepted because it is recognized as communication data never having been received. By using the hash function as described above, it is not necessary to store all communication data having been received; by storing the hash values, the problem can be addressed.

Furthermore, it is general that processing of the hash function is included in generation and verification of the digital signature. In a case of signature generation, calculation or the like is performed, using a secret key of a public key cryptography, with respect to a hash value of data to be digitally signed; in a case of signature verification, calculation or the like is performed, using a public key of the public key cryptography, with respect to the hash value of data to be digitally signed.

PRIOR ART DOCUMENT

Patent Document

Patent Document 1: Japanese Patent Laid-Open Publication No. 2007-88737

SUMMARY OF THE INVENTION

Problem to be Solved by the Invention

Conventionally, when communicating with many roadside devices or vehicles, a huge amount of distribution information is to be verified; therefore, it is preferable that the amount of processing necessary for verifying distribution information is as little as possible. Especially when performing, as the distribution information verification, at least digital signature verification and freshness verification, the hash function calculation must be performed two times or more.

The present invention is made to solve the problem described above and aims to efficiently perform distribution information verification including digital signature verification and freshness verification, and to realize the verification in a device having less processing capability.

Means for Solving Problem

In order to solve the problem described above, a data authentication device includes: a memory unit that stores, as an authentication information history, a history of second authentication information of communication data which was received in the past from another communication device and which includes first authentication information, distribution information, and the second authentication information; and an authentication processing unit that verifies, on the basis of first authentication information of new communication data being newly received communication data, authenticity of second authentication information of the new communication data and that compares the second authentication information of the new communication data with the authentication information history stored in the memory unit to verify freshness of the new communication data.

Furthermore, a data authentication method of the present invention includes: a memory step of storing, as an authentication information history, a history of second authentication information of communication data which was received in the past from another communication device and which includes first authentication information, distribution information, and the second authentication information; and an authentication processing step of verifying, on the basis of first authentication information of new communication data being newly received communication data, authenticity of second authentication information of the new communication data and comparing the second authentication information of the new communication data with the authentication information history stored in the memory unit to verify freshness of the new communication data.

Effect of the Invention

According to the present invention, a hash function's calculation result in signature verification is used not only for the signature verification but also for freshness verification, which makes unnecessary a hash function calculation conventionally performed for the freshness verification, so that hash function calculation conventionally performed two times can be reduced to that performed a single time. This brings an effect of reducing the processing load.

MODES FOR CARRYING OUT THE INVENTION

Embodiment 1

Figure 1:
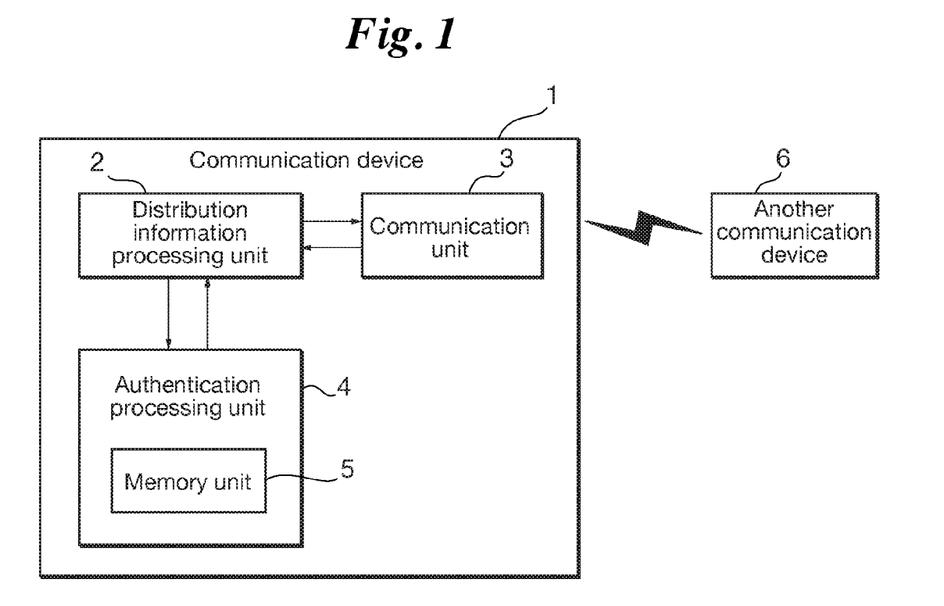
FIG. 1 is a configuration diagram showing a practical example of a data authentication device according to Embodiment 1 of the present invention.

In Embodiment 1, an embodiment will be shown in which hash function calculations in verifying digital signature and in verifying freshness for distribution information verification are integrated to verify distribution information. FIG. 1 is a configuration diagram showing an example of a data authentication device according to Embodiment 1 of the present invention. In cases of road-vehicle communication and vehicle-vehicle communication, a roadside device placed by the roadside communicates with an in-vehicle device mounted in a vehicle, and the in-vehicle device communicates with the roadside device and another in-vehicle device. Hereinafter, the roadside devices and the in-vehicle devices are collectively called and described as communication devices in this embodiment.

In FIG. 1, a communication device 1 is a communication device that transmits communication data including distribution information to another communication device 6 and receives communication data transmitted by another communication device 6. The communication device 1 includes a communication unit 3 that generates communication data to be transmitted to another communication device 6 and transmits the communication data to the another communication device 6, a distribution information processing unit 2 that processes distribution information included in the communication data received by the communication unit 3 from the another communication device 6, and an authentication processing unit 4 that serves as a data authentication device to generate and verify, using the distribution information and key information stored in advance, authentication information with which a receiving side verifies the validity of the transmitting side; the communication unit 3 further performs wireless communication such as DSRC (Dedicated Short Range Communication) or wireless LAN with another communication apparatus. The authentication processing unit 4 is provided with a memory unit 5 which is a memory readable and writable for the authentication processing unit 4 and stores key information used for generating and verifying authentication information and an authentication information history being a history of authentication information having been received in the past, as information used for performing freshness verification.

In a case where, for example, a digital signature according to a public key algorithm is used, the key information includes a public key certificate issued by a certification authority, a secret key corresponding to the public key contained in the public key certificate, a public key certificate of the certification authority, and the like; in a case where a common key algorithm is used, the key information includes a common key used for communication, an ID specifying the common key to be used, and the like.

Information for verifying freshness includes a hash value of distribution information, an ID of a certificate used for verifying a signature added to the distribution information, an ID of a key used for verifying a MAC (Message Authentication Code) added to the hash value and the distribution information, and the like.

Although not shown in the figure, current position information, and date and time information indicating the date and time are inputted to the communication device 1 from a roadside device or a vehicle in each of which a communication device 1 is mounted. Such information is generated by a GPS receiver, a gyroscope, a timepiece, or the like which is placed in the roadside device or the vehicle.

Figure 2:
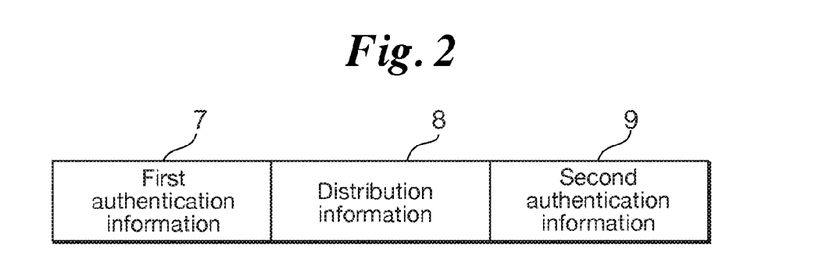
FIG. 2 is a diagram showing a data structure of communication data distributed between communication devices.

Next, explanation will be made about a data structure of communication data transmitted and received between the communication devices. FIG. 2 is a diagram showing the data structure of communication data distributed between the communication devices. In FIG. 2, the communication data is configured with first authentication information 7, distribution information 8, and second authentication information 9, and the communication data is transmitted and received between the communication devices.

In a case where, for example, a digital signature according to a public key algorithm is used, the first authentication information 7 is a public key certificate of the communication device 1, an ID by which to identify the public key certificate, or the like. Furthermore, in a case where a common key algorithm is used, the first authentication information is session key information being a session key encrypted with a common key to be temporarily utilized, session key information which is a message authentication code added to a session key and then encrypted with the common key, or the like.

In a case where, for example, the public key algorithm is used, the second authentication information is a distribution information's digital signature generated according to the communication device's secret key, or the like; in a case where the common key algorithm is used, the second authentication information is a message authentication code generated according to the session key, or the like.

Using such a data structure, communication data shown in FIG. 2 is transmitted. Although not shown in the figure, the communication data or the distribution information may be encrypted and transmitted depending on the system.

Figure 3:
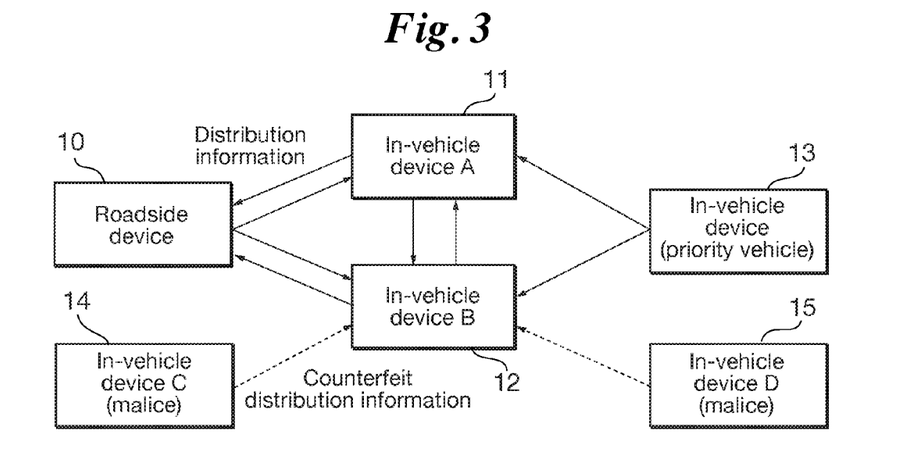
FIG. 3 is a diagram showing a configuration of a driving support system using the data authentication device according to Embodiment 1 of the present invention.
Figure 4:
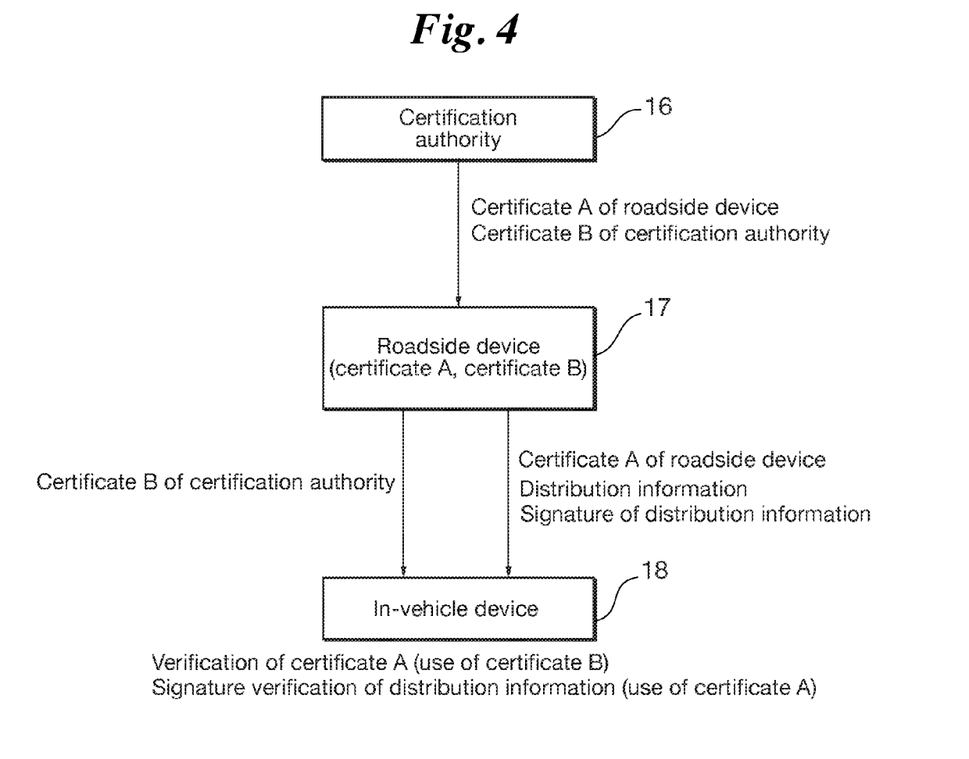
FIG. 4 is a diagram showing a configuration of a road-vehicle communication system of the present invention.
Figure 5:
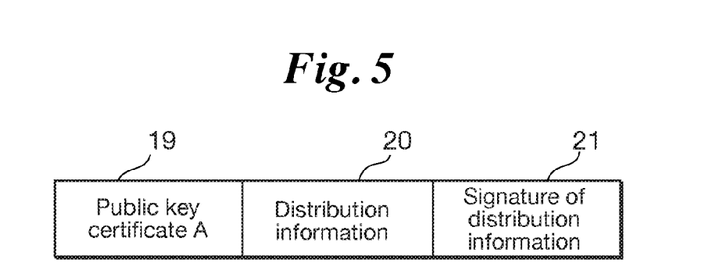
FIG. 5 is a diagram showing a data structure of communication data of the road-vehicle communication system of the present invention.

Next, explanation will be made about a driving support system using the data authentication device according to Embodiment 1 of the present invention. FIG. 3 is a diagram showing a configuration of the driving support system using the data authentication device according to Embodiment 1 of the present invention. In FIG. 3, a roadside device 10 distributes its distribution information to the neighboring in-vehicle devices, and each in-vehicle device similarly distributes its distribution information to other in-vehicle devices. In such a driving support system, it is conceivable that a malicious user abuses an in-vehicle device C 14 or an in-vehicle device D 15 to make it pretend to be a roadside device 10 or an in-vehicle device 13 (priority vehicle) and make it distribute counterfeit information to other in-vehicle devices, causing confusion or traffic accidents. Therefore, it is necessary for a receiving side to have a security means to verify the validity of a transmitting side, that is a roadside device or an in-vehicle device that distributes the information; thus, the data authentication device of the present invention is used as the security means. In the following, explanation will be made about a road-vehicle communication system used in the driving support system, using FIG. 4 and FIG. 5. FIG. 4 is a diagram showing a configuration of the road-vehicle communication system of the present invention. FIG. 5 is a diagram showing a data structure of communication data for the road-vehicle communication system of the present invention. In the road-vehicle communication system shown in FIG. 4, a certification authority 16 issues a certificate A (public key certificate A) of a roadside device 17 and a certificate B (public key certificate B) of the certification authority 16, to the roadside device 17. The roadside device 17 distributes the public key certificate B of the certification authority having issued the public key certificate A, to an in-vehicle device 18. The roadside device 17 also generates, as shown in FIG. 5, a signature 21 (digital signature) of distribution information to distribute distribution information 20, the signature 21 of the distribution information, and the public key certificate A 19 with which to be able to verify the signature, to the in-vehicle device 18. By verifying the received public key certificate A 19 with the public key certificate B of the certification authority 16 and verifying the signature 21 of the distribution information with the public key certificate A 19, the in-vehicle device 18 confirms that the information has been distributed from a proper roadside device. In vehicle-vehicle communication, a similar security measure can be applied; by verifying information and a certificate distributed by an in-vehicle device pretending to be an emergency vehicle, it can be detected that an ordinary in-vehicle device pretends to be an emergency vehicle.

Figure 6:
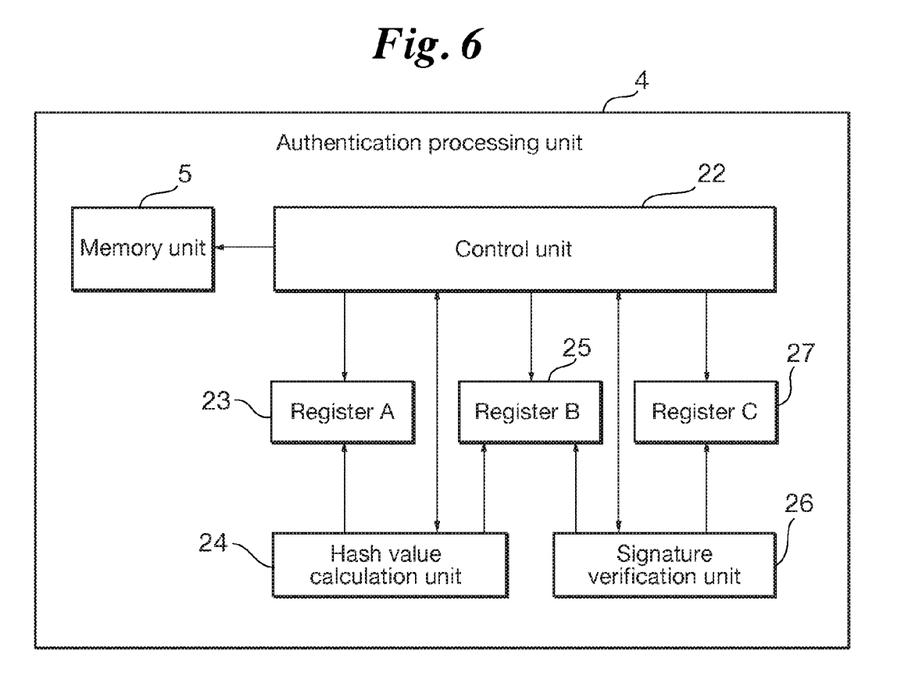
FIG. 6 is a diagram showing an example of a configuration of an authentication processing unit 4 according to Embodiment 1 of the present invention.
Figure 7:
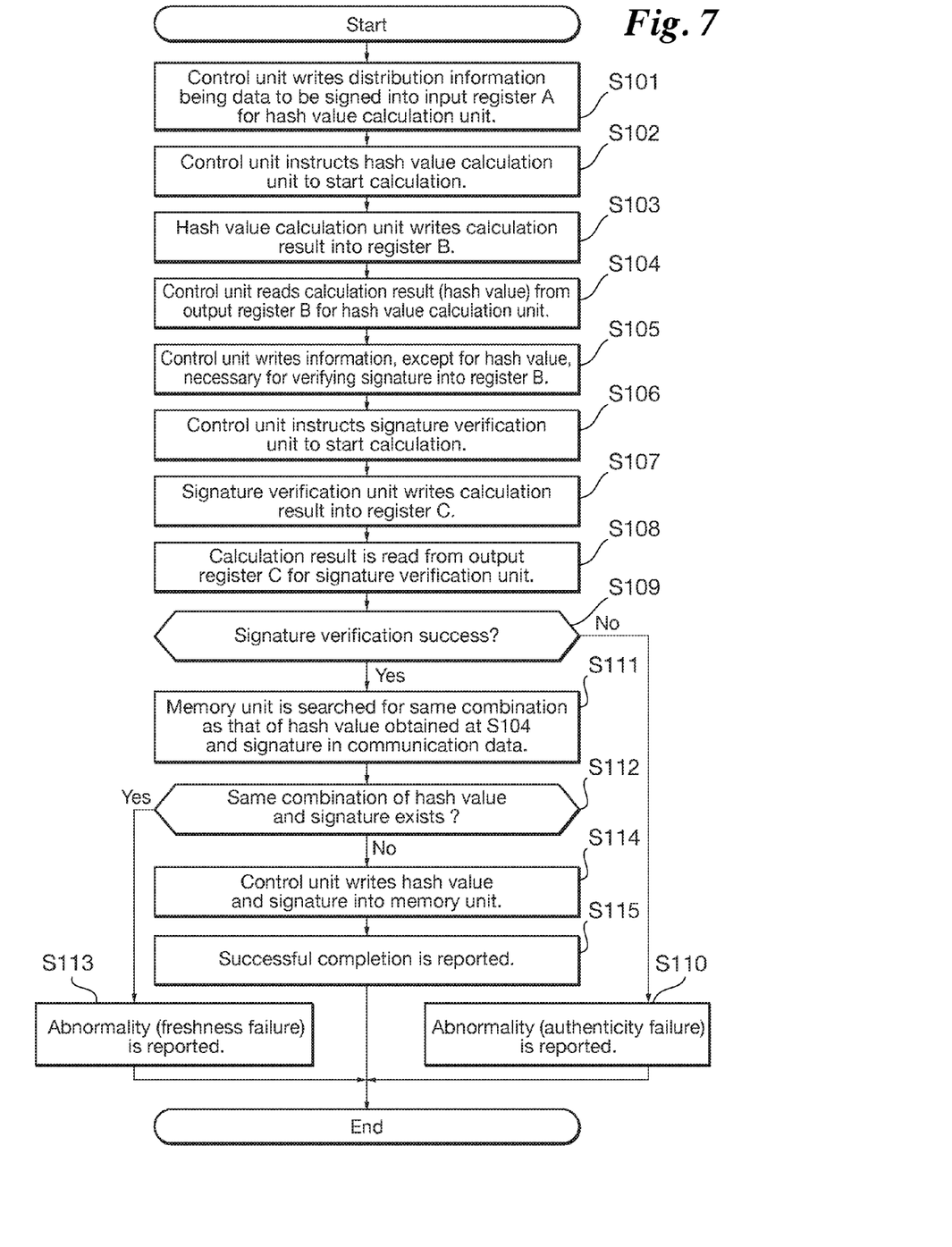
FIG. 7 is a flow chart representing the operation of the authentication processing unit 4 according to Embodiment 1 of the present invention when communication data is received.

Next, using FIG. 6 and FIG. 7, explanation will be made about a configuration of the authentication processing unit 4 of the communication device 1 and about a processing flow of the authentication processing unit 4 when receiving communication data. FIG. 6 is a diagram showing an example of a configuration of the authentication processing unit 4 according to Embodiment 1 of the present invention. FIG. 7 is a flow chart representing the operation of the authentication processing unit 4 according to Embodiment 1 of the present invention when communication data is received.

First, the configuration of the authentication processing unit 4 will be explained using FIG. 6. In FIG. 6, the authentication processing unit 4 includes the memory unit 5, a control unit 22, a hash value calculation unit 24, a signature verification unit 26, a register A 23 serving as an input to the hash value calculation unit 24, a register B 25 being an output from the hash value calculation unit 24 and serving as an input to the signature verification unit 26, and a register C 27 serving as an output from the signature verification unit 26. The description of the authentication processing unit 4 shown in FIG. 6 focuses on verifying distribution information. The authentication processing unit also includes a decode process in a case where the communication data is encrypted, and includes processes to encrypt and generate a signature (calculation according to a secret key) when generating communication data; however, these processes are omitted in FIG. 6.

Next, explanation will be made using FIG. 7 about a processing flow of the authentication processing unit 4 when receiving communication data. When verifying communication data, the control unit 22 first writes, in Step S101, distribution information being data to be signed into the input register A 23 for the hash value calculation unit 24. Then, at Step S102, the control unit 22 instructs the hash value calculation unit 24 to start calculation. Next, at Step S103, when the hash value calculation unit 24 completes its calculation, the hash value calculation unit writes the calculation result into the register B 25. Then, at Step S104, the control unit 22 detects, for example through an interrupt, the calculation completion of the hash value calculation unit 24, to read the calculation result (hash value) from the register B 25.

Next, at Step S105, the control unit 22 writes and sets information, except for the information having been set in the register B 25 at Step S103, necessary for verifying the signature into the register B 25. Then, at Step S106, the control unit 22 instructs the signature verification unit 26 to start calculation. Next, at Step S107, the signature verification unit 26 reads out the information which has been set in the register B 25 and necessary for verifying signature, and performs signature verification calculation, to write the calculation result into the register C 27.

Next, at Step S108, the control unit 22 detects, for example through an interrupt, the calculation completion of the signature verification unit 26, to read out the calculation result from the register C 27. Next, at Step S109, the control unit 22 determines, on the basis of the calculation result read out from the register C 27, whether the signature verification has succeeded or failed; if the signature verification has succeeded, the process proceeds to Step S111; if the signature verification has failed, the process proceeds to Step S110. Next, at Step S110, the control unit 22 reports to, for example, the distribution information processing unit 2, that the signature verification has failed (authenticity failure).

On the other hand, in a case where the signature verification has succeeded, the control unit 22 searches, at Step S111, the memory unit 5 for same combination data as that of the hash value obtained at Step S104 and the signature in the communication data currently under verification. As a result, in a case where there is the same combination data, the control unit 22 determines at Step S112 that freshness verification fails, so that the processing proceeds to Step S113; in a case where no same combination data is contained, the control unit determines that freshness verification succeeds, so that the processing proceeds to Step S114. Next, at Step S113, the control unit 22 reports, for example to the distribution information processing unit 2, that freshness verification has failed (freshness failure).

On the other hand, in a case where freshness verification has succeeded, the control unit 22 writes, at Step S114, a combination of the hash value obtained at Step S104 and the communication data's signature currently under verification, into the authentication information history of the memory unit 5. Then, at Step S115, the control unit 22 reports to, for example, the distribution information processing unit 2, that the communication data verification has successfully completed, thereby ending the process.

In addition, the processing flow of FIG. 7 focuses on verifying freshness and signature; therefore, description about other processes necessary for communication data verification such as certificate verification is omitted.

In FIG. 6, the register A 23, the register B 25, and the register C 27 are described as different registers; however, they may be a same single one. In a case where the hash value calculation unit 24 or the signature verification unit 26 is implemented with software, these registers correspond to memory areas, buffers, or the like.

In addition, in the processing flow of FIG. 7, the freshness verification is performed after the signature verification; however, the freshness verification may be performed before the signature verification. In such a process sequence, failure of the freshness verification makes unnecessary the signature verification, thereby reducing an entire processing load when the communication data verification fails.

Furthermore, the present invention is applicable as long as a digital signature algorithm or a hash function algorithm used therein is adopted.

As described above, in the invention of Embodiment 1, a result of calculating the hash function in signature verification is used not only for signature verification but also for freshness verification; this makes unnecessary a hash function calculation conventionally made for freshness verification, reducing two hash function calculations which have conventionally been made, to a single hash function calculation. This can reduce the processing load.

A certain amount of time is required not only for hash function calculations but especially also for writing into registers; therefore, by using a register in common as an output register for the hash value calculation unit 24 and as an input register for the signature verification unit 26, further process reduction can be expected.

Furthermore, the first authentication information 7 is assumed to be an ID for identifying a public key certificate, a public key certificate, or the like. In a conventional technique, because a hash value is calculated with respect to entire communication data, in a case where the first authentication information 7 of an intercepted communication data is a public key certificate, an attacker replaces the public key certificate with an ID, or in a case where the first authentication information is an ID, the attacker replaces the ID with a public key certificate, so that the attacker can make a receiving side receive different communication data having the exactly same meaning. That is, the receiving side cannot detect that it has been attacked. On the other hand, in the present invention, only the distribution information is inputted to the hash function; therefore, even if the first authentication information is replaced, this can cause a determination that the same communication data is received.

A combination of a hash value and a signature of distribution information is used for freshness verification; therefore, when it is desired that a same distribution information having a probabilistic cryptosystem digital signature is to be accepted at a receiving side, that can be realized by re-generating a signature for the same distribution information, and using the re-generated signature to configure communication data. In addition, by using only the hash value of distribution data for freshness verification, a similar effect can also be obtained.

Embodiment 2

In Embodiment 1, explanation has been made about a case where a digital signature is used as data authentication. In Embodiment 2, explanation will be made about a case where MAC (Message Authentication Code) is used as data authentication. Explanation of FIG. 1 and FIG. 2 is the same as in Embodiment 1; therefore, it will be omitted.

Figure 8:
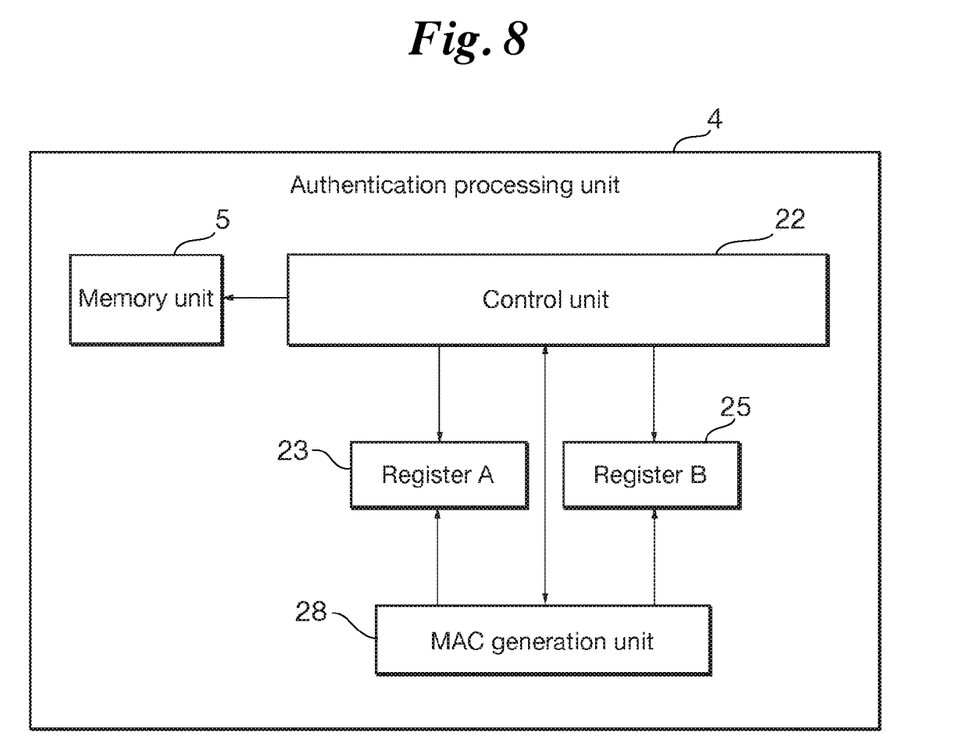
FIG. 8 is a diagram showing an example of a configuration of an authentication processing unit 4 according to Embodiment 2 of the present invention.
Figure 9:
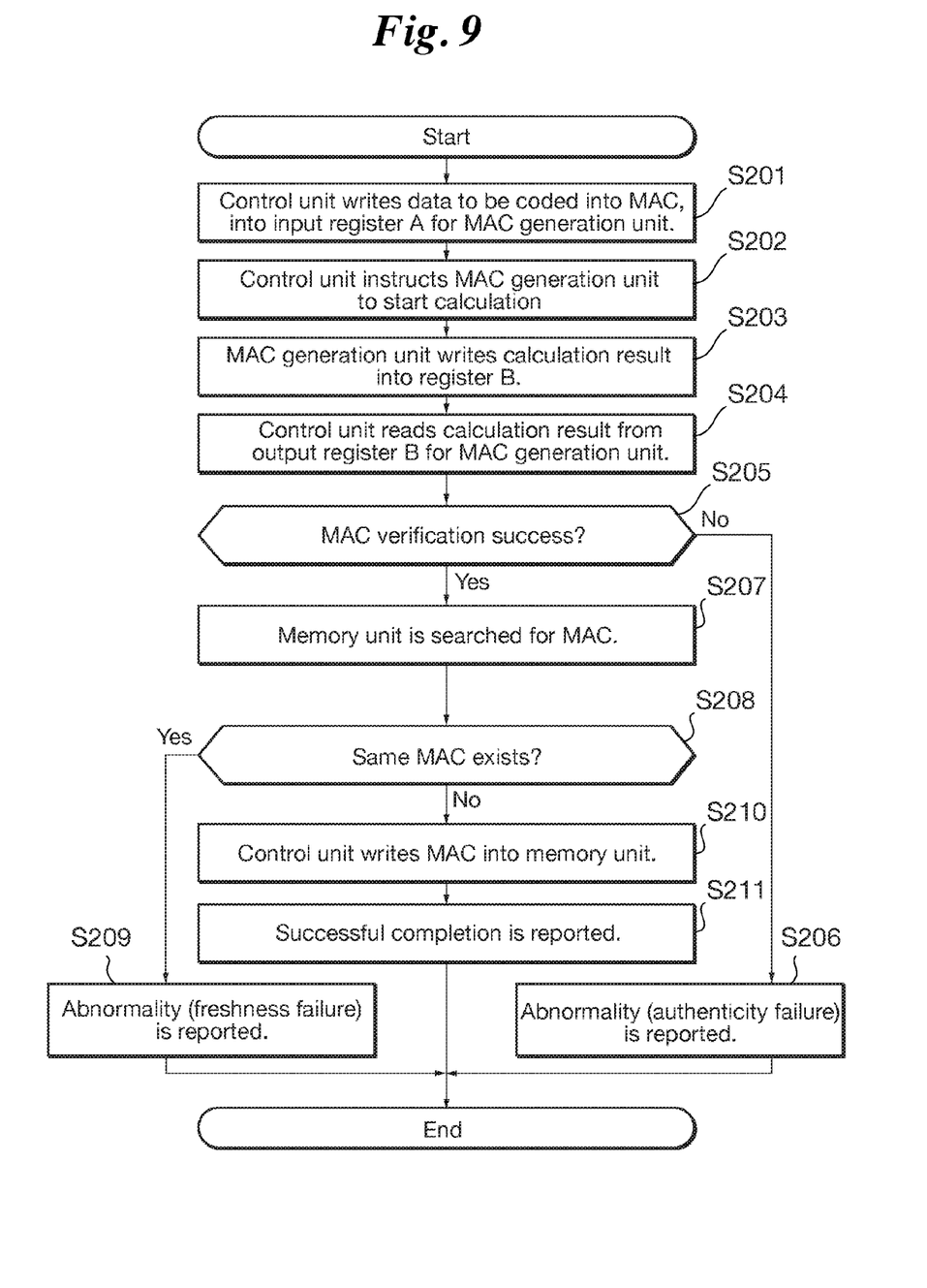
FIG. 9 is a flow chart representing the operation of the authentication processing unit 4 according to Embodiment 2 of the present invention when communication data is received.

In the following, explanation will be made using FIG. 8 and FIG. 9 about a configuration of an authentication processing unit 4 in the communication device 1 and a processing flow of the authentication processing unit 4 when receiving communication data. FIG. 8 is a diagram showing an example of a configuration of an authentication processing unit 4 according to Embodiment 2 of the present invention. FIG. 9 is a flow chart representing the operation of the authentication processing unit 4 according to Embodiment 2 of the present invention when communication data is received.

First, explanation will be made about the configuration of the authentication processing unit 4 using FIG. 8. In FIG. 8, the authentication processing unit 4 includes a memory unit 5, a control unit 22, a MAC generation unit 28, a register A 23 serving as an input to the MAC generation unit 28, and a register B 25 serving as an output from the MAC generation unit 28. In addition, the authentication processing unit 4 shown in FIG. 8 includes a decode process in a case where communication data is encrypted; the decode process is, however, omitted in FIG. 8 because the figure is drawn while focusing on verifying the distribution information.

Next, explanation will be made, using FIG. 9, about a processing flow of the authentication processing unit 4 when receiving communication data. First, at Step S201, when verifying the communication data, the control unit 22 writes distribution information, which is data to be coded into MAC, into the input register A 23 for the MAC generation unit 28. Next, at Step S202, the control unit 22 instructs the MAC generation unit 28 to start calculation. Next, at Step S203, when completing the calculation, the MAC generation unit 28 writes a calculation result in the register B 25.

Next, at Step S204, the control unit 22 detects the calculation completion of the MAC generation unit 28 by, for example, an interrupt or the like, to read the calculation result from the register B 25. After that, at Step S205, from the calculation result read out from the register B 25, the control unit 22 determines whether or not the signature verification has succeeded; if the signature verification has succeeded, the processing proceeds to Step S207, or if the signature verification has failed, the processing proceeds to Step S206. Next, at Step S206, the control unit 22 reports to, for example, the distribution information processing unit 2, that the signature verification has failed (authenticity failure).

On the other hand, in a case where the signature verification has succeeded, the control unit 22 performs searching at Step S207 to determine whether or not the memory unit 5 stores a same MAC value as a MAC value obtained from the communication data or as a MAC value obtained at Step S204 (these are the same value). According to the result, if the same MAC value is stored, the control unit 22 determines at Step S208 that freshness verification fails, so that the processing proceeds to Step S209; or if the same MAC value is not stored, the control unit determines that freshness verification succeeds, so that the processing proceeds to Step S210.

Next, at Step S209, the control unit 22 reports to, for example, the distribution information processing unit 2, that the freshness verification has failed (freshness failure). On the other hand, in a case where the freshness verification has succeeded, the control unit 22 writes the MAC value at Step S210 into the authentication information history of the memory unit 5. Then, at Step S211, the control unit 22 reports to, for example, the distribution information processing unit 2, that the communication data verification has successfully completed, thereby ending the process.

In addition, the processing flow of FIG. 9 focuses on the freshness verification and the signature verification; therefore, description about other processes necessary for communication data verification such as session key decoding is omitted.

In addition, in FIG. 8, the register A 23 and the register B 25 are described as different registers; however, they may be a single one. In a case where the MAC generation unit 28 is implemented with software, these registers correspond to memory areas, buffers, or the like.

In addition, in the processing flow of FIG. 9, the freshness verification is performed after MAC verification; however, the freshness verification may be performed before the MAC verification. In such a processing sequence, failure of the freshness verification makes the MAC verification unnecessary, thereby reducing an entire processing load when the communication data verification fails.

As described above, by replacing the hash function's calculation performed for the freshness verification with MAC, the hash function's calculation itself can be deleted, thereby reducing the processing load.

NUMERAL EXPLANATION 1 communication device
2 distribution information processing unit
3 communication unit
4 authentication processing unit
5 memory unit
6 another communication device
7 first authentication information
8 distribution information
9 second authentication information
10 roadside device
11 in-vehicle device A
12 in-vehicle device B
13 in-vehicle device (priority vehicle)
14 in-vehicle device C (malice)
15 in-vehicle device D (malice)
16 certification authority
17 roadside device
18 in-vehicle device
19 public key certificate A
20 distribution information
21 signature of distribution information
22 control unit
23 register A
24 hash value calculation unit
25 register B
26 signature verification unit
27 register C
28 MAC generation unit

The invention claimed is:

1. A data authentication device, comprising:
a hash value calculator to calculate a hash value of distribution information,
a memory to store, as an authentication information history, a history of second authentication information of communication data which was received in the past from another communication device and which includes first authentication information, the distribution information, and the second authentication information, the memory storing the hash value of the distribution information calculated by the hash value calculator so as to relate the hash value to the second authentication information of the authentication information history; and
an authenticator to verify, on the basis of first authentication information of new communication data being newly received communication data, authenticity of second authentication information of the new communication data and to compare a hash value of distribution information included in the new communication data and the second authentication information included therein with the authentication information history stored in the memory to verify freshness of the new communication data.

2. The data authentication device according to claim 1, wherein the second authentication information is a digital signature based on a public key cryptography.

3. The data authentication device according to claim 1, wherein the second authentication information is a MAC (Message Authentication Code) based on a common key cryptography.

4. A data authentication method comprising:
calculating a hash value of distribution information;
storing, as an authentication information history, a history of second authentication information of communication data which was received in the past from another communication device and which includes first authentication information, the distribution information, and the second authentication information, and storing the calculated hash value of the distribution information so as to relate the hash value to the second authentication information of the authentication information history; and
verifying, on the basis of first authentication information of new communication data being newly received communication data, authenticity of second authentication information of the new communication data and comparing a hash value of distribution information included in the new communication data and the second authentication information included therein with the stored authentication information history, for verifying freshness of the new communication data.

* * * * *